Dec. 17, 1957 E. A. RICHARDS ET AL 2,817,047
DRY CONTACT RECTIFIERS
Filed Aug. 23, 1954 5 Sheets-Sheet 1
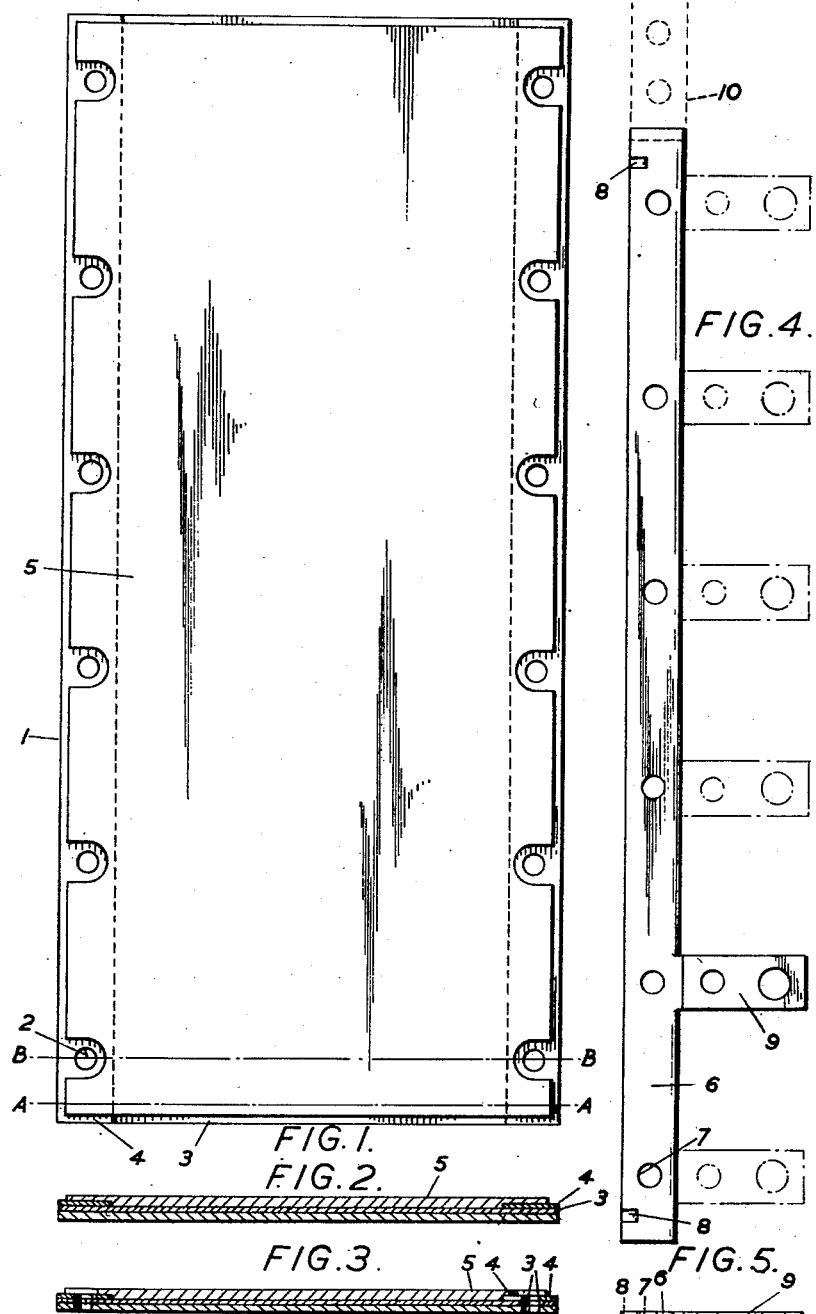
Inventors
E. A. RICHARDS
L. J. ELLISON
By Philip M. Bolton
Attorney

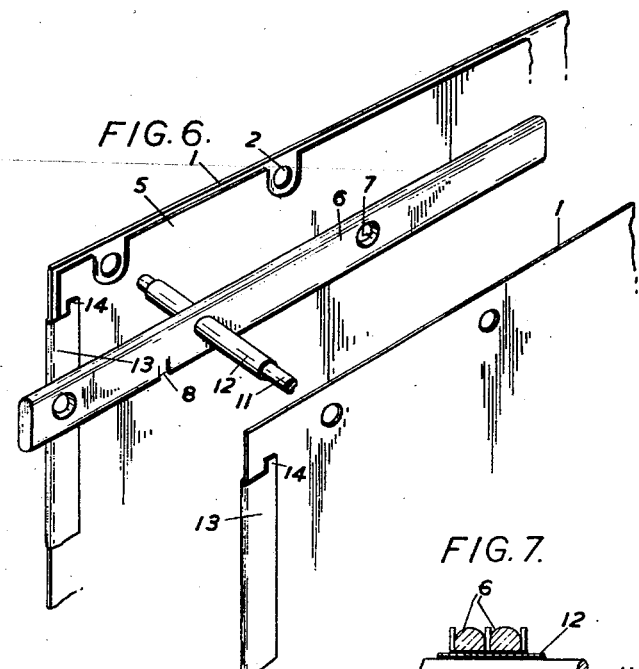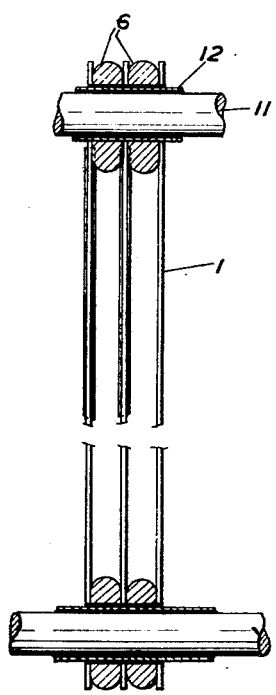

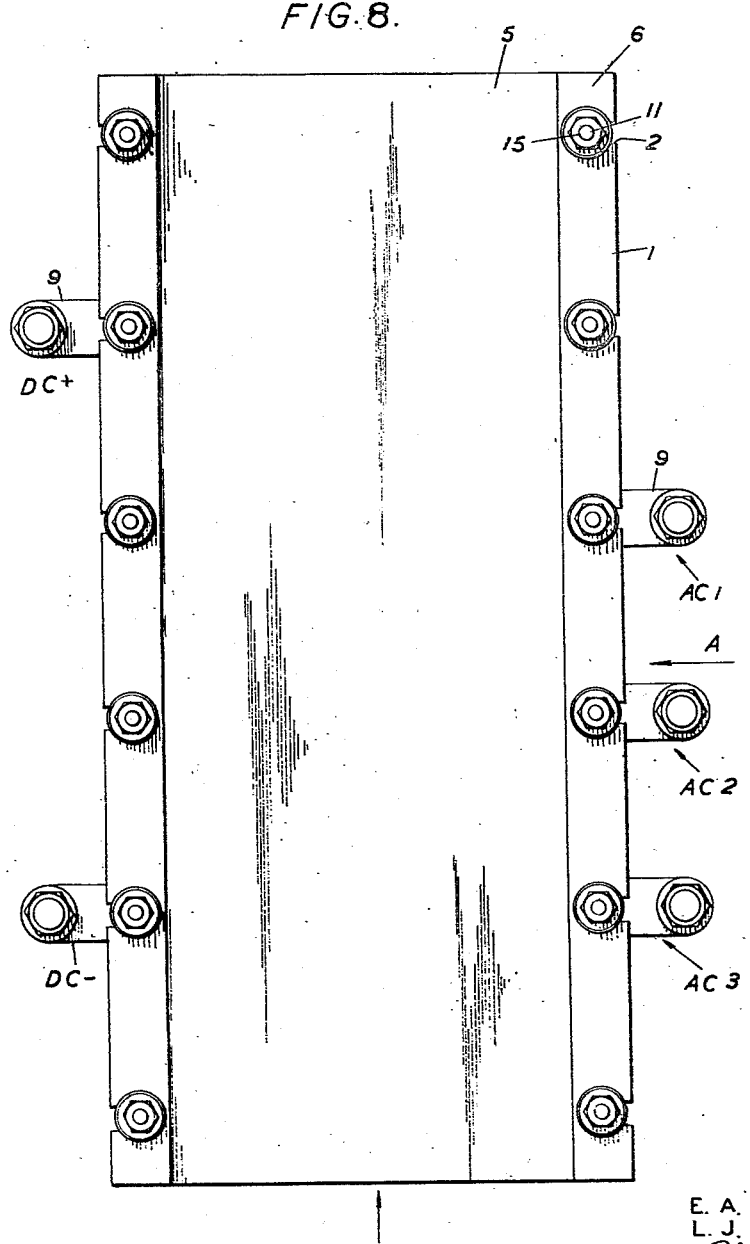

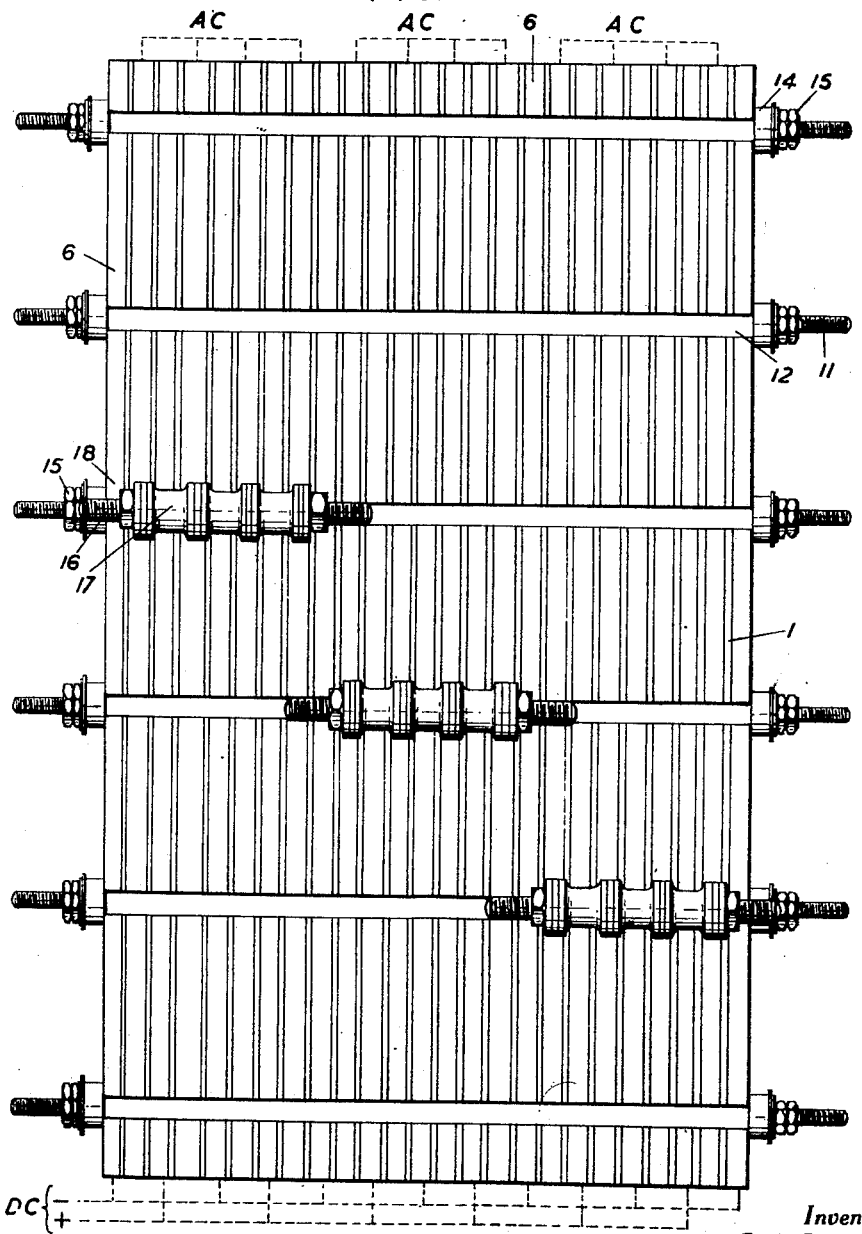

Dec. 17, 1957 E. A. RICHARDS ET AL 2,817,047
DRY CONTACT RECTIFIERS
Filed Aug. 23, 1954 5 Sheets-Sheet 5
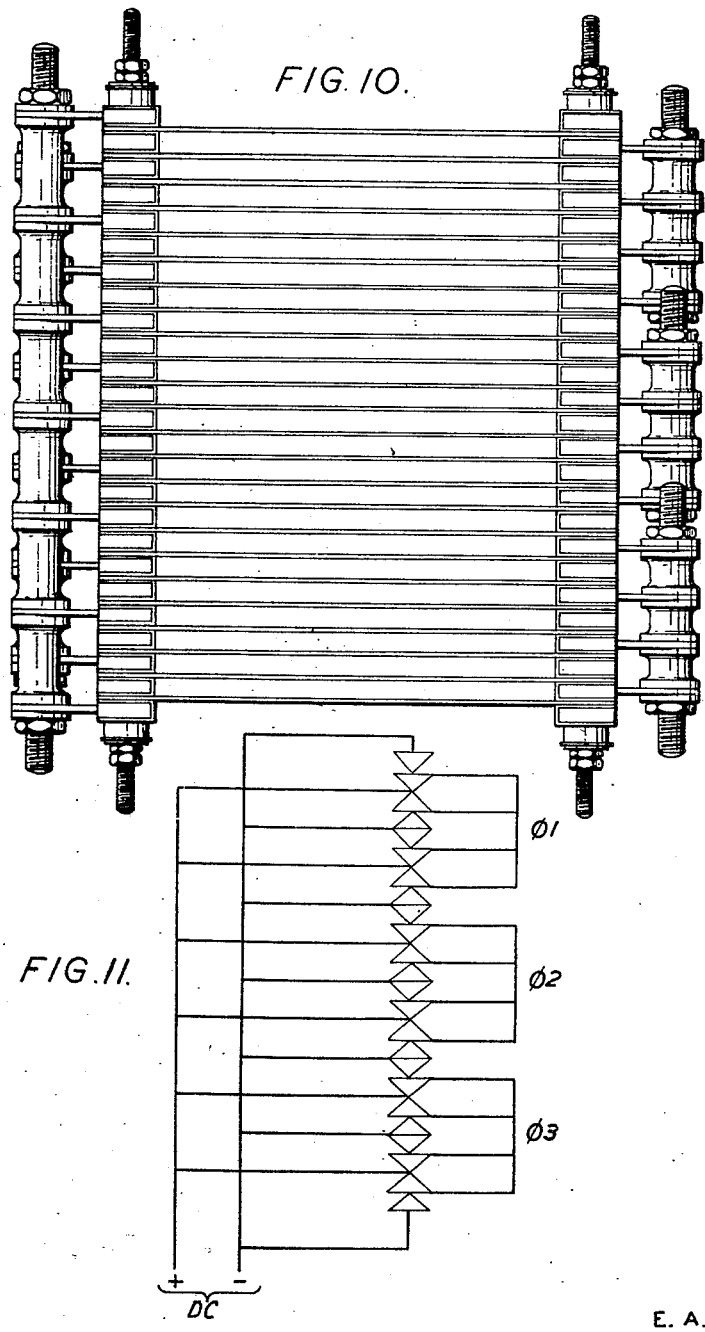
Inventors
E. A. RICHARDS-
L. J. ELLISON
By Philip M. Bolton
Attorney

United States Patent Office 2,817,047
Patented Dec. 17, 1957

2,817,047
DRY CONTACT RECTIFIERS

Edward Arthur Richards and Leslie James Ellison, London, England, assignors to International Standard Electric Corporation, New York, N. Y.

Application August 23, 1954, Serial No. 451,573

Claims priority, application Great Britain August 28, 1953

7 Claims. (Cl. 317—234)

This invention relates to electrical selenium rectifiers and has for its objects a form of rectifier, and rectifier assembly, particularly suitable for air-craft.

The main feature of the invention comprises a rectangular selenium rectifier plate which is pierced with a row of holes along each major edge, and which incorporates a strip of insulating material between the base-plate and the selenium or between the selenium and the counter-electrode along each major edge and extending on both sides of the corresponding row of holes, whereby a number of such plates can be stacked with intervening spacing and electrically connecting bus bars between parallel pairs of edges of each adjacent pair of plates, and clamped together to form a stack.

The invention will be described with reference to embodiments thereof shown in the accompanying drawings in which:

Fig. 1 shows a rectifier plate in plan view;

Fig. 2 shows the rectifier plate of Fig. 1 in cross-section on the line AA;

Fig. 3 shows the rectifier plate of Fig. 1 in cross section on the line BB;

Fig. 4 shows a bus bar for interposing between the major edges of adjacent rectifier plates of the type shown in Fig. 1;

Fig. 5 is an end view of the bus bar shown in Fig. 4;

Fig. 6 is an exploded perspective view of an assembly of two rectifier plates with an interposed bus bar;

Fig. 7 shows in end view an assembly of three rectifier plates with interposed bus bars;

Fig. 8 is a plan view of a rectifier stack made up of a number of plates of the type shown in Fig. 1 with interposed bus bars of the type shown in Fig. 4;

Fig. 9 is a side elevation of the rectifier stack shown in Fig. 8;

Fig. 10 is an end elevation of the rectifier stack shown in Fig. 8; and

Fig. 11 is the diagrammatic representation of the circuit of the rectifier stack shown in Figs. 8, 9 and 10 which is arranged for the rectification of three-phase A. C. current.

Referring now to Fig. 1, the reference 1 indicates generally a rectifier plate and particularly the base plate of aluminium alloy. Base plate 1 is completely coated on one side with selenium 3 in well known manner.

The coated plate is pierced with a series of holes 2 along the two major edges.

A coating of insulating material is now applied along each major edge over the selenium as indicated at 4. This insulating material may be a paint or paper and extends from the edge beyond the row of holes. A mask is now applied to the plate covering the edges and areas around the holes: the central unmasked area of the plate is sprayed, or otherwise coated, with counter-electrode material in well-known manner. The plates manufactured in this way are formed in well-known manner before use.

For assembling such plates in a stack, metal bus-bars of the type shown in Figs. 4 and 5 are used. Each bus bar has a lateral terminal extension 9 at any one of the positions indicated in Fig. 4, or alternatively an end terminal 10. The terminals may be of the same thickness as the bus bars or of reduced thickness. At each end depressions 8 are formed on both sides of the bus bar for a purpose which will be explained later. Holes 7 are provided in the bus bar for assembly bolts 11 surrounded by insulating tubes 12 on which plates and bus bars are alternately threaded as shown in Figs. 6 and 7. On the same minor edge of each plate is mounted a U-shaped protecting strip 13 of insulating material, preferably of fibre-glass stiffened with insulation.

Each insulating strip carries a tongue 14 at each end so positioned as to co-operate with the depressions 8 in the bus bar in Fig. 6, whereby the strips 13 are held in position on the edges of the plates by the bus bars, which interlock therewith.

Rectifier stacks of this type are suitable for cooling by high speed air currents, for instance, those encountered when such stacks are mounted in exposed positions on air-craft. The edges protected by the strips 13 will form the leading edges exposed to the high speed air-currents, the strips 13 protecting the plates from abrasion by sand or other particles in the air-stream. The stack therefore consists of a number of parallel plates with a pair of bus bars between the major (or minor) edges of each pair of adjacent plates. The plates and bus bars are threaded on insulating tubes surrounding bolts passing through both rows of holes 2, 7 in the plates and bus bars.

The stack is held together by insulating washers 14 and nuts 15, Fig. 9, on the ends of the bolts 11. In Figs. 8–10 the holes 2 in the plates are replaced by slots extending to the edges of the plates. In the stack shown in Figs. 8–10, lateral terminals are provided on the bus bars in the positions indicated in these figures. The A. C. connections are made on one side of the stack and D. C. connections on the other side. For connections for the different A. C. phases three sets of terminals, four in each set, are brought out in groups and each group is inter-connected by metal connectors 17 and by bolts and nuts 16—18, Fig. 9. Two sets of D. C. connections are made, each set comprising terminals from alternate bus bars as shown in Fig. 10. The connections between the plates for three-phase purposes have been shown by the broken line connections at the top and bottom of Fig. 9.

The orientation of the twenty-four plates in the stack and their connections are separately shown in Fig. 11. Of course, similar stacks can be used for other rectification purposes, the orientation of the stacks and their interconnections being modified for any particular rectification requirement. It will be seen that connection to the rectifier plates, both for assembly and for electrical purposes is wholly confined to the edge areas in which insulation material is provided between the selenium and the counter-electrodes. This resistance material could alternatively be provided between base plate and the selenium. In both cases it renders those particular areas useless for rectification purposes, but allows pressure to be applied without increase in the reverse resistance of the rectifiers, in the manner covered by British Patents Nos. 526,482 (Richards-Ellison) and 570,722 (Richards).

It will be seen that the stack is so arranged that a free passage exists for air through the stack between each pair of adjacent plates and the bus bars spacing them. The stack is therefore adapted for air-cooling, and the protecting strips 13 on the front edges on the plate prevents damage due to particles carried by the air stream.

The stack constitutes a rigid box-like structure which can easily be mounted in a suitable ducting so that air can pass freely between the plates from one end to the other without obstruction from the electrical connections.

The plates can be protected from the effects of moisture by dipping the whole structure into insulating paint or lacquer and draining off the surplus insulating material. While the stacks are shown secured by means of bolts, the plates may be clamped together to form the stack in any other known way.

While the principles of the invention have been described above in connection with specific embodiments, and particular modifications thereof, it is to be clearly understood that this description is made only by way of example and not as a limitation on the scope of the invention.

What we claim is:

1. A selenium rectifier stack comprising a plurality of rectangular rectifier plates, each plate comprising a base electrode, a selenium layer and a counter-electrode, and provided with a row of holes along each major edge, a strip of insulating material positioned between one of said electrodes and said selenium layer along each major edge and extending on both sides of the corresponding row of holes, means for stacking said plates in spaced relationship, means for connecting electrical bus bars between adjacent edges of parallel plates, and means for clamping said plates and bus bars to form a rigid stack.

2. A rectifier stack according to claim 1 wherein said bus bars constitute spacing means between adjacent plates.

3. A rectifier stack according to claim 1 in which said stack is clamped by insulated bolts passing through the rows of holes in the edges of the plates and through corresponding holes in the bus bars.

4. A rectifier stack according to claim 1 and in which the minor edges of the plates are covered with protecting material against abrasion by bombardment with moving particles in an air-stream.

5. A rectifier stack as claimed in claim 4 and in which edge protectors and bus bars are interlocked so that the bus bars hold the protectors in position.

6. A rectifier stack according to claim 1 wherein said bus bars have terminal extensions positioned to allow interconnection of the plates according to the rectifier circuit required.

7. A rectifier stack as claimed in claim 6 and in which each bus bar has a lateral terminal extension, the positions of the extensions at both sides of the stack being arranged in vertical groups for direct interconnection.

References Cited in the file of this patent

UNITED STATES PATENTS

| | | |
|---|---|---|
| 2,378,411 | Kotterman | June 19, 1945 |
| 2,716,207 | Cepon et al. | Aug. 23, 1955 |